United States Patent [19]

Clay, Jr.

[11] Patent Number: 4,771,816
[45] Date of Patent: Sep. 20, 1988

[54] PLASTIC HINGED AND WEATHERSTRIPPED METAL OVERHEAD DOOR

[75] Inventor: Roy T. Clay, Jr., Snyder, N.Y.

[73] Assignee: Whiting Roll-Up Door Mfg. Corp., Akron, N.Y.

[21] Appl. No.: 859,025

[22] Filed: May 2, 1986

[51] Int. Cl.⁴ .............................................. E06B 3/22
[52] U.S. Cl. .................................. 160/235; 160/201; 160/40
[58] Field of Search .................. 160/235, 229 R, 232, 160/233, 234, 40, 201; 16/221, 223, 225, 226, 375, 385, DIG. 13

[56] References Cited

U.S. PATENT DOCUMENTS

| | | | |
|---|---|---|---|
| 2,831,537 | 4/1958 | Ritter | 160/229 R |
| 3,034,575 | 5/1962 | Stroup | 160/40 |
| 3,148,724 | 9/1964 | Chieger et al. | 160/201 X |
| 3,302,690 | 2/1967 | Hurd | 160/201 X |
| 3,347,305 | 10/1967 | Urbanick | 160/201 X |
| 3,527,283 | 9/1970 | Butler et al. | 160/229 R |
| 3,570,579 | 3/1971 | Matsushima | 160/235 |
| 3,815,657 | 6/1974 | Malek et al. | 160/229 R |
| 3,894,571 | 7/1975 | Hinchliff | 160/235 X |
| 4,368,772 | 1/1983 | Bouthillier | 160/232 |
| 4,563,381 | 1/1986 | Woodland | 16/225 X |

Primary Examiner—Ramon S. Britts
Assistant Examiner—David M. Purol
Attorney, Agent, or Firm—Sommer & Sommer

[57] ABSTRACT

Overhead door construction for a truck van or the like including metal door sections pivotally connected by the rigid part of a dual durometer plastic hinge member having a flexible part for sealing the joint between adjacent door sections when the door is closed.

5 Claims, 1 Drawing Sheet

U.S. Patent    Sep. 20, 1988    4,771,816
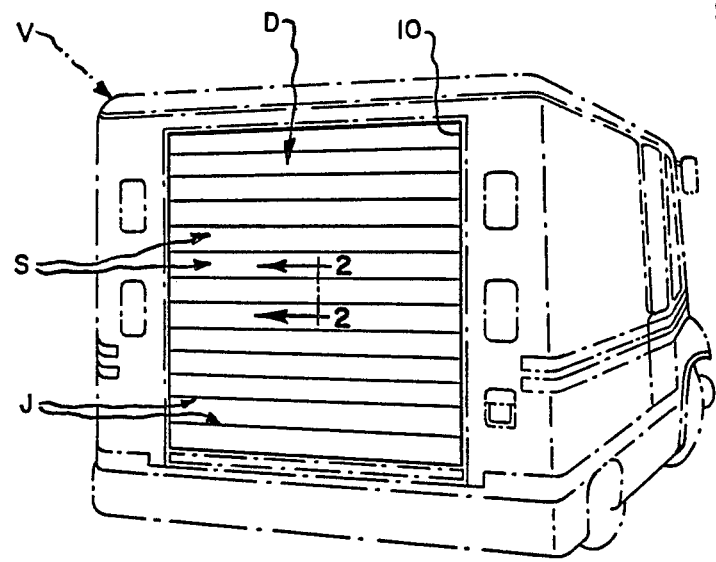
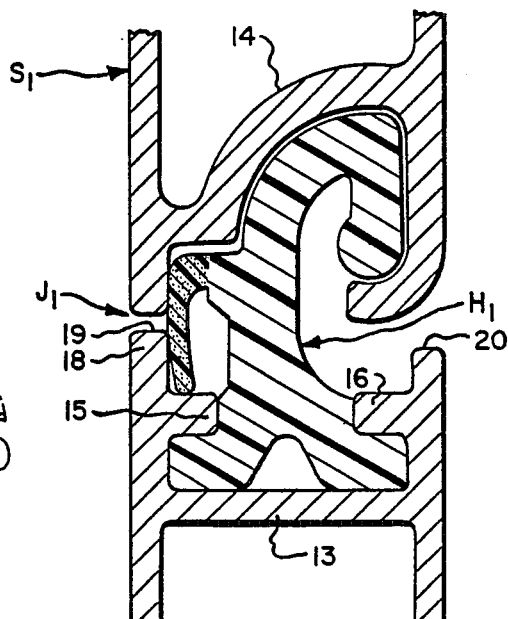
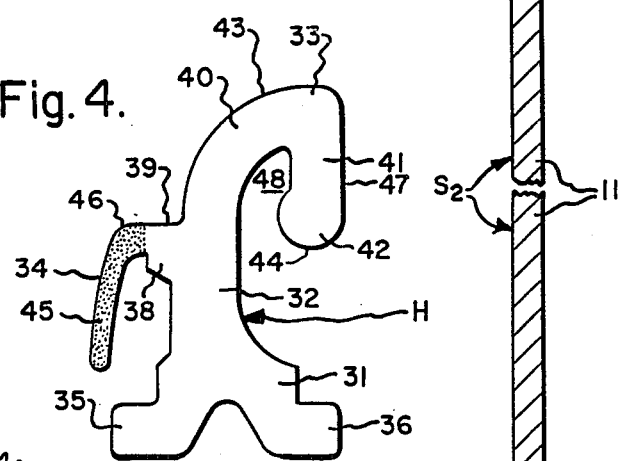
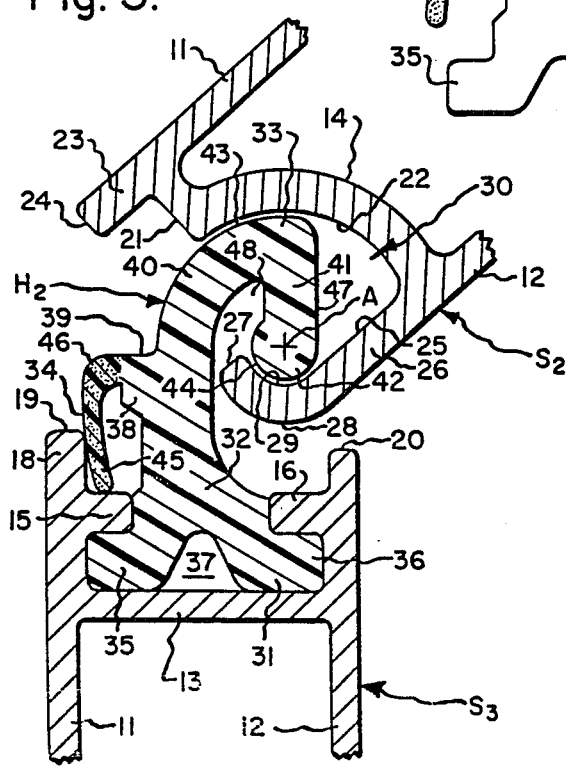
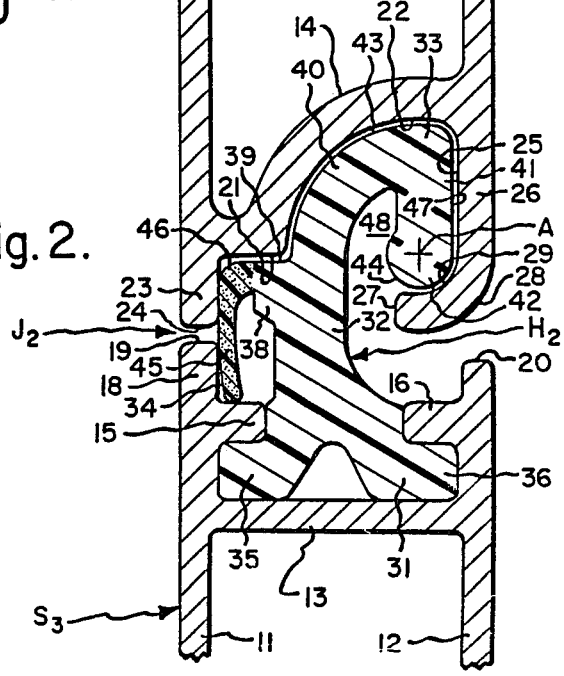

4,771,816

PLASTIC HINGED AND WEATHERSTRIPPED METAL OVERHEAD DOOR

FIELD OF THE INVENTION

This invention relates to the field of overhead doors made up of a plurality of doors sections hinged together and capable of being moved along a track from a substantially vertical position closing an access opening and to be raised upwardly and guided by the track through a curved path into an overhead substantially horizontal position in order to uncover said opening. Such overhead doors are commonly used to close the access opening in the rear of a van body arranged on a truck frame or on a trailer pulled by a truck.

BACKGROUND OF THE INVENTION

The invention is concerned principally with the construction of the means for hinging two door sections together in an overhead door intended particularly for use in a postal truck van. In such a van used to deliver and pick up mail and parcels, it is desirable to have an overhead door in which the door sections are made up of similar elongated extruded lightweight metal sections, individually relatively narrow in width, such as from about $2\frac{1}{2}$ to $4\frac{1}{2}$ inches, and relatively thin so as to have a thickness of not more than about $\frac{1}{2}$ inch. It is also desirable to provide an overhead door made up of such metal sections which will not rattle and make noise when the truck van is being driven, which is quiet in operation when being raised or lowered, and which will effectively seal the joint between the adjacent door sections against water and dust entering the van when the door is closed.

SUMMARY OF THE INVENTION

Accordingly, the objects of the invention are to provide such an overhead door construction which possesses these desirable features. These objects are accomplished by providing a plastic hinge member between and connecting a pair of metal door sections arranged edge to edge in closely spaced relation. Such member is fixed to one of the door sections and has a rigid pin part received in a socket provided in the other door section, and also has a flexible part which seals the joint between such door sections when they are substantially coplanar, as when the door is closed.

These objects and other advantages will be apparent from the preferred embodiment of the present invention illustrated in the accompanying drawing.

BRIEF DESCRIPTION OF THE DRAWING

FIG. 1 is a perspective view of the rear end of a typical postal van, illustrated in broken lines, equipped with an overhead door embodying the present invention, represented by solid lines in a closed position.

FIG. 2 is an enlarged fragmentary vertical sectional view an adjacent pair of door sections shown in FIG. 1, and taken on line 2—2 thereof.

FIG. 3 is a fragmentary view of one of the hinged connections between the panels shown in FIG. 2, and illustrating the possible pivotal movement there between as when the overhead door is following the curved portion of its track (not shown).

FIG. 4 is an end elevational view of the plastic hinge member shown in FIGS. 2 and 3.

DESCRIPTION OF PREFERRED EMBODIMENT

Referring to FIG. 1, the truck van V is shown as having an access opening 10 in its rear, closed by an overhead door D illustrated in a down or closed position. This door D is made up of a plurality of similar elongated metal sections S, adjacent pairs of which provide a joint J therebetween. Three such sections are illustrated in FIG. 2 and are designated $S_1$, $S_2$ and $S_3$, respectively. The joint between sections $S_1$ and $S_2$ is represented by $J_1$, and that between sections $S_2$ and $S_3$ by $J_2$. Between the adjacent pairs of door sections is interposed an elongated hinge member H, illustrated separately in FIG. 4. One such member is interposed between sections $S_1$ and $S_2$, designated $H_1$; another between $S_2$ and $S_3$, designated $H_2$.

The construction of the upper and lower edge portions of door section $S_2$ is illustrated in FIG. 2, which construction is representive of the other sections $S_1$ and $S_3$ as well. Section $S_2$ is shown as having an outer or left wall panel 11, an inner or right wall panel 12, both connected adjacent their upper ends by a transverse web 13 and adjacent their lower ends by a transverse web 14. Above upper transverse web 13, section $S_2$ is shown as provided with a pair of opposed inwardly extending horizontal ribs 15 and 16, attached to outer and inner panels 11 and 12, respectively, to secure the hinge member as explained later herein. The portion of left panel 11 extending above left rib 15 provides an upstanding flange 18, the upper end face 19 of which is arranged at a slightly higher level than the upper end face 20 of the inner panel 12.

Turning attention to the lower end of section $S_2$, the left portion of web 14 is shown as having a flat lower horizontal surface 21, and the right portion of this web is arcuate and has a lower concave surface 22. The portion of left panel 11 is shown as extending downwardly below flat surface 21 to provide a depending flange 23, having a lower end face 24. The slight spacing or gap between the opposing flange end faces 19 and 24 of adjacent door sections S provides one of the joints J.

Concave surface 22 is preferably cylindrical by being generated at a constant radius about a horizontal axis A and subtends an angle of about 90°. The lower and left end of concave surface 22 joins the right end of flat surface 21, while the upper and right end of this concave surface is filleted into the vertical inside surface 25 of right wall panel 12. A relatively substantial portion of this right panel extends downwardly below the aforementioned filleted connection with web 14 to provide a flange 26. The lower end portion of this flange 26 is shown as curled in to provide a hook 28 having a tip 27 and an upper concave surface 29, also preferably cylindrical and generated at a constant radius about horizontal axis A, subtending an angle of slightly more than 90°. Thus, concave surfaces 22 and 29 provide an interrupted socket 30 (FIG. 3) in section $S_2$. The salient of the lower surface of hook 28 is at about the same level as end face 24.

Considering now hinge member H shown in FIG. 4, the same includes a rigid base part 31, an upstanding rigid intermediate part 32, a rigid head or pin part 33, and a flexible weatherstrip part 34. Base part 32 is formed with left and right feet or horizontal flanges 35 and 36, respectively, which are received in the inverted tee-shaped slot or groove 37 provided in the upper edge of one of the sections S, such as the section S₂, provided by the corresponding ribs 15 and 16.

Intermediate part 32 rises above the upper end face 19 of left flange 18 and includes a leftward projection 38 having a flat upper surface 39. This surface 39 is arranged to be abuttingly engaged by the flat lower surface 21 of the next higher door section, when the outer or left panels 11 of adjacent door sections are substantially coplanar, as shown in FIG. 2.

Pin part 33 includes an upwardly and rightwardly arched portion 40, from the upper end of which depends a flat-sided bar portion 41, having an outer or right flat side 47, terminating at its lower end in a slightly enlarged bead portion 42. Arched portion 40 has an upper partially cylindrical surface 43, generated about axis A which is centered in bead portion 42. This bead portion has an external partially cylindrical surface 44, also generated about axis A but with a smaller radius. Convex surfaces 43 and 44 form an interrupted male pin surface pivotally received in socket 30 so as to oppose and be engagable with corresponding generally complementary concave surfaces 22 and 29.

Flexible part 34 is shown as having a downturned flap or strip portion 45 secured at its upper and slightly thicker elbow portion 46 to the side of projection 38 on intermediate hinge part 32. When a hinge member H is mounted on a section S, flap portion 45 has a vertical extent sufficient to extend behind and be deformed to press against the inside or right surface of upstanding flange 18 of the door section to which the hinge member is fastened. As one door section is pivoted on the door section immediately below so as to bring their left panels 11 into substantial coplanar alignment, the inner surface of the lower flange 23 of the upper door section has a wiping and slight deforming engagement with the salient of the elbow portion 46. When these left panels 11 of adjacent door sections are finally in substantially coplanar relation, as depicted in FIG. 2, the flap portion 45 bridges across the gap forming the corresponding joint J and presses against the inner surfaces of the opposing flanges 18 and 23, thereby to seal such joint against rain and dust entering the truck van.

There exists a space 48 between the bar portion 41 and arched portion 40 of the hinge member which accommodates the tip portion 27 of hook 28 when door section S₂ is pivoted clockwise relative to the door section S₃, as depicted in FIG. 3. The vertical distance between end face 20 on right panel 12 of door section S₃ and the salient lower surface 44 of bead portion 42 of hinge member H₂ is less than the offset of hook tip 27 from the outside surface 50 of right panel 12 of door section S₂. This arrangement prevents separation of door sections S₂ and S₃, even though they might be disposed at right angles to each other. In such position, (not shown) hook 28 would be in space 48 to prevent separation. An intermediate relative pivotal position between door sections S₂ and S₃ is depicted in FIG. 3.

Referring to FIGS. 2 and 3, it will be seen that hook 28 engaging bead 42 prevents separation of door sections S₂ and S₃ when in any possible relative pivotal position. Also, when door sections S₂ and S₃ are coplanar as shown in FIG. 2, the opposing curved surfaces 22 and 43, and also the flat surface 25 opposing flat surface 47, prevent horizontal displacement of one of these door sections relative to the other.

Hinge member H is an elongated element having a length corresponding to that of the two adjacent door sections S between which it is interposed and pivotally connects for limited relative pivotal movement. Hinge member H is preferably formed as an integral or one-piece extrusion in which the rigid parts are composed of a low temperature, high impact PVC (Polyvinylchloride), such as Type 2 Grade 1 PVC per ASTM-1784 specification, and in which the flexible part is composed of a non-rigid PVC compound formulated principally for use in automotive weatherstripping applications. Typically, the one-piece hinge member is made of dual durometer thermoplastic material in which the rigid parts have a hardness rating of about 78±3 durometer D scale, and in which the flexible part has a hardness rating of about 78±3 durometer A scale.

The door sections are assembled by first inserting one end of the base part 31 of a hinge member H into the end of the groove 37 of a given door section and then sliding it along such groove until its ends are substantialy coterminous with the ends of the door section. The next higher door section is then mounted on the head part 33 of the already mounted hinge member by inserting one end of the latter into the end of socket 30 of such higher door section and sliding it along the full length of the head part. This procedure is repeated for successive door sections until a door having the desired height is built up.

The track, guide and counterbalance means for the overhead door are not illustrated since they form no part of the present invention. Person skilled in the art of making overhead doors will know how to provide such means which are suitable.

The door sections S are preferably made by cutting off similar lengths of a suitable lightweight metal extrusion and made of aluminum or an alloy thereof, for example, the length cutoff to provide a door of the desired width from end to end. Hinge members H are similarly provided by cutting off corresponding lengths of a plastic extrusion.

By "truck van" as used in the appended claims is meant any vehicle body, whether on the frame of a truck or trailer.

Changes in and modifications to the preferred embodiment illustrated and described herein may occur to those skilled in the art wihtout departing from the spirit of the invention which is to be measured by the scope of the appended claims.

What is claimed is:

1. In an overhead door for a truck van, the combination comprising:

a pair of relatively pivotal elongated metal door sections arranged with their adjacent longitudinal edges opposed and spaced apart, each of said sections including an outer wall flange extending along its edge and having an end face and a substantially planar inner surface, said end face of said flange of said one of said sections opposing and being spaced from said end face of said flange of the other of said sections when such flanges are substantially coplanar to provide a gap between such end faces defining a joint, and a one-piece elongated thermoplastic hinge member non-pivotally fastened to one of said sections and relatively pivotal to the other of said sections, including a rigid pin part received in a socket provided in said other of said sections and a flexible part arranged to extend across said gap and bear against such inner surfaces of said flanges when substantially coplanar thereby to seal said joint, said one-piece material being made of dual durometer thermoplastic material such that the hardness rating of said rigid pin part is greater than the hardness rating of said flexible part.

2. The combination as set forth in claim 1 in which the hardness rating for said rigid part is about 78 durometer D scale and the hardness rating for said flexible part is about 78 durometer A scale.

3. The combination set forth in claim 1 in which said member has a first rigid stop surface, and said other of said sections has a second stop surface engageable with said first stop surface when said flanges are substantially parallel, thereby to limit relative pivotal movement between said sections in one direction.

4. The combination set forth in claim 1 in which said pin part has first and second convex surfaces of different radii and circumferentially spaced, and said socket of said other sections has first and second concave surfaces generally complementary to and engageable with said first and second convex surfaces, respectively.

5. The combination set forth in claim 4 in which engagement of said first convex and concave surfaces limits movement of said sections toward each other, and engagement of said second convex and concave surfaces limits movement of said sections away from each other.

* * * * *